(12) United States Patent
Kiriyama et al.

(10) Patent No.: US 7,265,338 B2
(45) Date of Patent: Sep. 4, 2007

(54) PHOTOELECTRIC ENCODER USING AN INCOHERENT SEMICONDUCTOR LIGHT SOURCE

(75) Inventors: Tetsuro Kiriyama, Kawasaki (JP); Toru Yaku, Kawasaki (JP); Shingo Nihommori, Himeji (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/257,895

(22) Filed: Oct. 25, 2005

(65) Prior Publication Data

US 2006/0097141 A1 May 11, 2006

(30) Foreign Application Priority Data

Nov. 8, 2004 (JP) ............................. 2004-323206

(51) Int. Cl.
*G01D 5/34* (2006.01)
*G01D 5/36* (2006.01)
*G01D 5/38* (2006.01)
*G01J 1/04* (2006.01)

(52) U.S. Cl. ..................... 250/231.13; 250/231.14; 250/231.18; 250/237 R; 250/237 G; 341/13; 341/31

(58) Field of Classification Search ............ 250/237 R, 250/237 G, 231.13, 231.14, 231.18; 341/13, 341/31; 33/1 PT
See application file for complete search history.

(56) References Cited

U.S. PATENT DOCUMENTS

| | | | | |
|---|---|---|---|---|
| 5,026,164 A | * | 6/1991 | Ichikawa | ..................... 356/619 |
| 5,648,658 A | * | 7/1997 | Holzapfel et al. | ...... 250/237 G |
| 6,234,648 B1 | | 5/2001 | Borner et al. | |
| 6,597,006 B1 | * | 7/2003 | McCord et al. | ........ 250/559.19 |

FOREIGN PATENT DOCUMENTS

| | | |
|---|---|---|
| DE | 43 37 005 A1 | 5/1995 |
| EP | 0 291 148 B1 | 6/1992 |
| EP | 0 718 601 B1 | 11/2001 |
| GB | 2 120 880 A | 12/1983 |

* cited by examiner

*Primary Examiner*—Georgia Epps
*Assistant Examiner*—Patrick J. Lee
(74) *Attorney, Agent, or Firm*—Rankin, Hill, Porter & Clark LLP

(57) ABSTRACT

A photoelectric encoder is provided, which emits light from a light source to a main scale and an index scale that can relatively move with respect to each other and obtains a light-receiving signal by interaction between the main scale and the index scale. The photoelectric encoder uses as the light source an incoherent semiconductor light source (white LED) in which a full width at half maximum of an emission spectrum is wider than that of a monochromatic semiconductor light source. Thus, it is possible to reduce an effect of a gap change on an output signal of the encoder and make positional adjustment easier, thereby improving misalignment characteristics.

14 Claims, 7 Drawing Sheets

PHOTOELECTRIC ENCODER USING AN INCOHERENT SEMICONDUCTOR LIGHT SOURCE

CROSS-REFERENCE TO RELATED APPLICATION

The disclosure of Japanese Patent Application No. 2004-323206 filed on Nov. 8, 2004 including specifications, drawings and claims is incorporated herein by reference in its entirety.

BACKGROUND OF THE INVENTION

1. Field of the Invention

The present invention relates to a photoelectric encoder that emits light from a light source to a main scale and an index scale that can relatively move with respect to each other and obtains a light-receiving signal by interaction between the main scale and the index scale. More particularly, the present invention relates to a photoelectric encoder that has an output signal less affected by a gap change, allows for easy positional adjustment, and has good misalignment characteristics.

2. Description of the Related Art

A photoelectric encoder that emits light from a light source to a main scale and an index scale that can relatively move with respect to each other and obtains a light-receiving signal by interaction between the main scale and the index scale is conventionally used for precise measurement of linear displacement, angular displacement, and the like.

One type of the photoelectric encoder is a so-called two-grating type, shown in FIG. 1. The two-grating type photoelectric encoder uses a scale (optical) grating 21 provided on a main scale 20 and an index (optical) grating 31 provided on a light-transmitting index scale 30. In FIG. 1, a light-receiving element is denoted with 32 and a light-receiving portion is denoted with 34.

In the two-grating type photoelectric encoder, as a gap G between the scale grating 21 and the index grating 31 becomes smaller, effects of diffusion of light and the like become smaller and therefore resolution of the encoder is improved. When the gap G between the gratings is small (e.g., 10 to 50 µm), however, adjustment for positioning the main scale 20 and the index scale 30 is difficult (i.e., misalignment characteristics are not good). Therefore, assembly of the encoder takes a lot of efforts. Moreover, there is a limitation to reduce the gap G between the gratings.

On the other hand, in a so-called three-grating type photoelectric encoder disclosed in Japanese Patent Laid-Open Publication No. 2003-279383, another (optical) grating (called as a first grating) 11 is further arranged between a light source portion 4 including a light-emitting diode (LED) 6 and a collimator lens 8 and the main scale 20 (at a different location from the index grating 31 on the index scale 30 in this example), as shown in FIG. 2. FIG. 2 shows a reflective type as an example. Light from the light source portion 4 is diffracted by the first grating 11. The diffracted light from the first grating 11 is further diffracted by the scale grating (called as a second grating) 21 provided on the main scale 20. Interference fringes generated by diffraction at the scale grating 21 are received by the light-receiving element 32 of the light-receiving portion 34 through the index grating (called as a third grating) 31. As shown in FIG. 2, the light source portion 4, the index scale 30, and the light-receiving portion 34 are provided in a sensor head 2 that can relatively move with respect to the main scale 20.

It is known that an intensity distribution of the interference fringes observed at the light-receiving element 32 does not depend on the gap G between the gratings (i.e., a gap between the first grating 11 and the second grating 21 and a gap between the third grating 31 and the second grating 21). Thus, the gap G between the gratings can be made larger in the three-grating type, as compared with the two-grating type. Thus, adjustment for positioning the scales can be performed more easily in the three-grating type than in the two-grating type (i.e., the three-grating type has better misalignment characteristics than the two-grating type).

However, even if the gap G between the optical gratings can be made larger, adjustment for positioning the scales is still difficult (i.e., misalignment characteristics are not good), because an output signal is largely affected by a gap change and margin of an error of the gap from a designed value of the gap is small.

A photoelectric encoder using a light-receiving element array as the light-receiving portion, in which an index grating and a light-receiving element are integrated with each other and the light-receiving element is arranged in a form of a grating, as described in the description of Japanese Patent No. 2610624, also has the above same problem.

SUMMARY OF THE INVENTION

Therefore, it is an object of the present invention to provide a photoelectric encoder that can improve misalignment characteristics in a gap direction and can improve usability.

According to the present invention, a photoelectric encoder is provided, which emits light from a light source to a main scale and an index scale that can relatively move with respect to each other and obtains a light-receiving signal by interaction between the main scale and the index scale. The photoelectric encoder uses an incoherent semiconductor light source in which a full width at half maximum of an emission spectrum is wider than that of a monochromatic semiconductor light source, as the light source. Due to this, the above object can be achieved.

In the photoelectric encoder, diffusing means such as a diffuser or a prism may be combined with the incoherent semiconductor light source.

In the photoelectric encoder, a white light-emitting diode (LED), a combination of a plurality of monochromatic LEDs having different central wavelengths from each other, a combination of a plurality of monochromatic laser diodes (LDs) having different central wavelengths from each other, a superluminescent diode (SLD), or a combination of a plurality of SLDs having different central wavelengths from each other may be used as the incoherent semiconductor light source.

According to the present invention, the incoherent semiconductor light source in which the full width at half maximum of the emission spectrum is wider than that of the monochromatic light source is used. Thus, it is possible to reduce an effect of a gap on a change in an intensity of an output signal and improve misalignment characteristics and usability.

For example, the white LED has a broader spectrum and a lower coherence degree, as compared with the monochromatic LED conventionally used, as described later. Thus, when using the white LED, generation of higher-order diffracted light that is unnecessary for a three-grating type encoder can be reduced, whereas 0-th order diffracted light and the first-order diffracted light that are necessary can be sufficiently obtained. Therefore, the three-grating type encoder having the improved misalignment characteristics can be obtained. Especially, in the case where no diffusing means is used, reduction of the size and the cost of the encoder can be achieved.

The encoder to which the present invention can be applied is not limited to the three-grating type. The present invention can be also applied to a two-grating type.

On the other hand, white light sources (e.g., an incandescent lamp) conventionally used other than an LED can be used in order to obtain a broad spectrum. However, those white light sources have a significantly shorter operating life, as compared with semiconductor light sources such as an LED. Therefore, those white light sources are impractical.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Preferred exemplary embodiments of the present invention will now be described in detail, with respect to the drawings.

Figure 2:
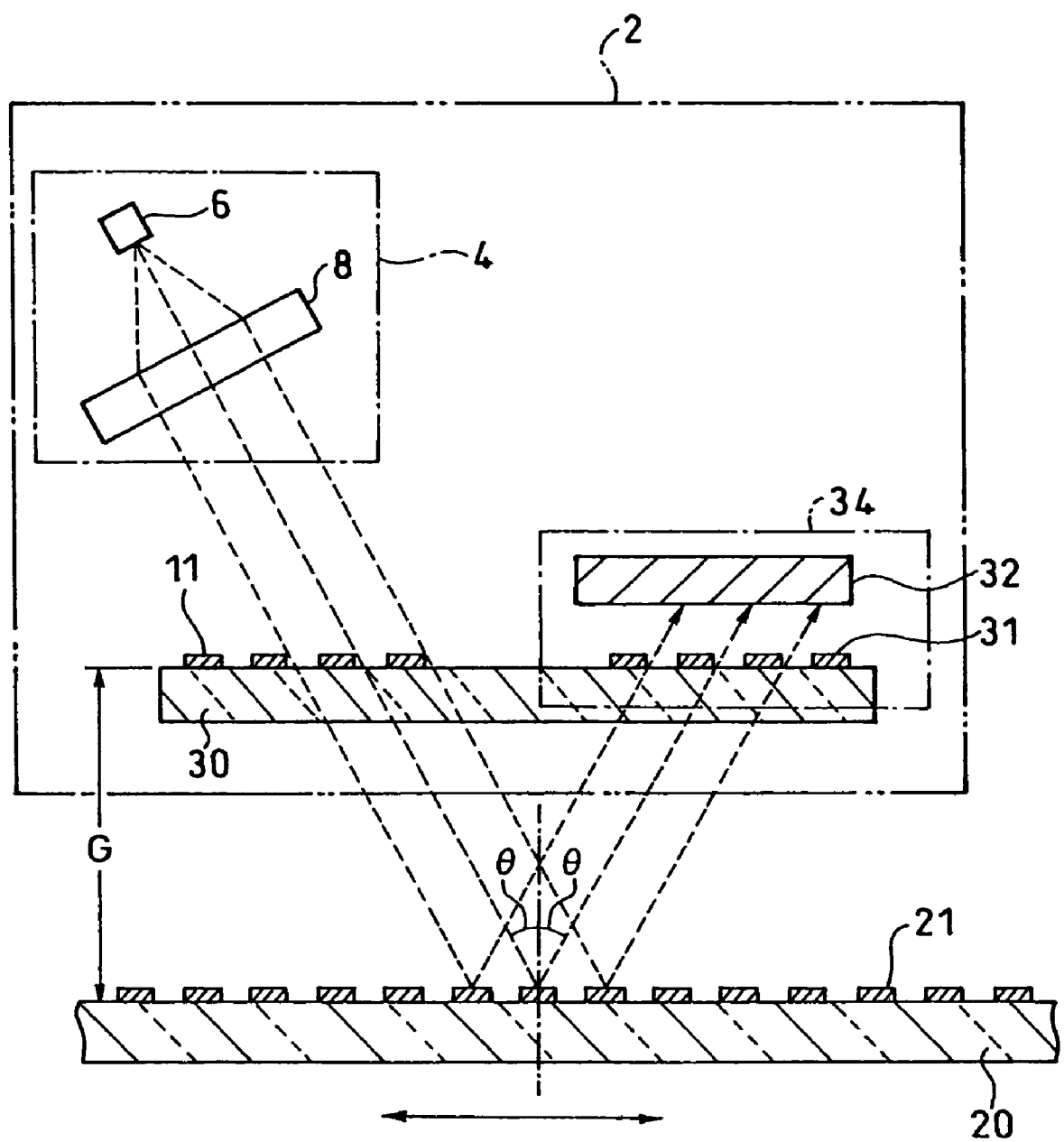
FIG. 2 is a cross-sectional view showing an example of the configuration of a three-grating type reflective photoelectric encoder.
Figure 3:
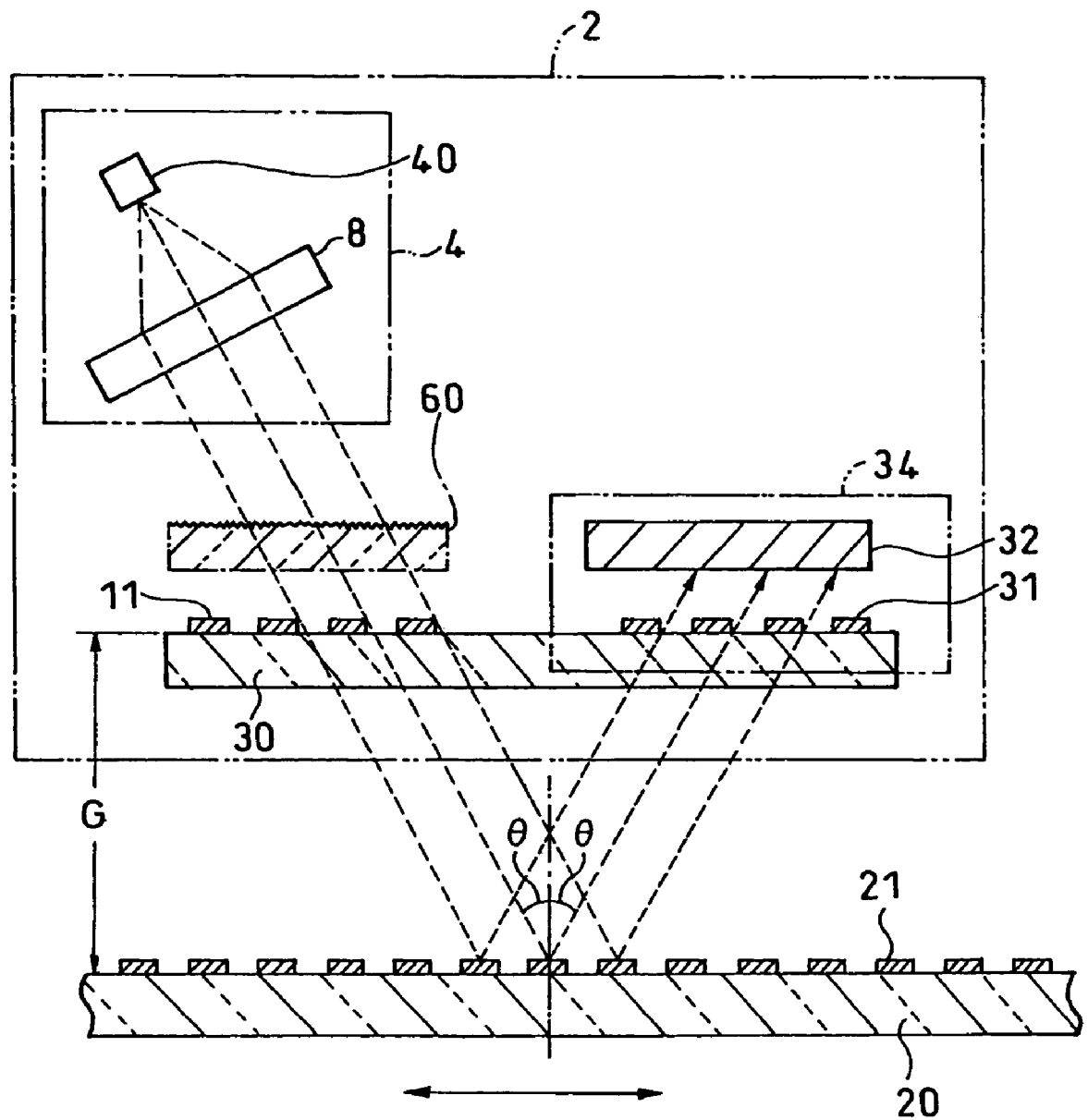
FIG. 3 is a cross-sectional view showing the configuration of a three-grating type reflective photoelectric encoder according to a first exemplary embodiment of the present invention.

In the first exemplary embodiment of the present invention shown in FIG. 3, a white LED 40 is used as the light source of the light source portion 4 in the three-grating type reflective encoder shown in FIG. 2. Except for the above, the encoder of the present exemplary embodiment is the same as that shown in FIG. 2 and therefore the detailed description thereof is omitted.

The optical grating 21 provided on the main scale 20 is typically formed by a deposition film of a metal such as Cr. When using a conventional monochromatic light source in the reflective photoelectric encoder shown in FIG. 3, variation of the thickness of the metal deposition film by several tens of nanometers will change an output signal of the encoder. This is because a part of incident light having a wavelength $\lambda$ from the monochromatic light source is reflected by an upper surface of the scale grating 21 of the main scale 20 and another part of incident light is reflected by a portion of the main scale 20 where the scale grating 21 is not formed, i.e., by a substrate (typically formed of glass) of the main scale 20. The light reflected from the scale grating 21 and the light reflected from the substrate interfere with each other, thereby causing a change in the amount of received light. In general, the thickness of the scale grating 21 is precisely controlled so as not to be approximately equal to $(2n+1)*\lambda/4$ (where n is a given integer) in order to prevent occurrence of the above interference. However, control of the thickness of the scale grating 21 over a long scale is very difficult. Due to this, a manufacturing yield of the main scale 20 is lowered. According to the present invention, a light source for emitting white light is used as the light source. Thus, a change in the amount of the received light caused by the above interference can be reduced. This can increase the manufacturing yield of the main scale 20 and the manufacturing cost can be largely reduced.

Moreover, a protection film that is typically transparent is formed on a front surface of the light-receiving element 32. However, incident light having a wavelength $\lambda$ from the monochromatic light source is reflected by a front surface and a rear surface of the protection film by single or multiple reflection, and therefore interference occurs in the reflected light because of the thickness of the protection film. This interference also causes the change in the amount of the received light. In general, the thickness of the protection film is controlled and manufactured so as not to cause such a problem. However, a number of light-receiving elements are usually manufactured on a single semiconductor wafer. Thus, the thickness of the protection film formed on the light-receiving element provided at the center of the wafer is slightly different from that in a periphery of the wafer. This thickness difference causes an individual difference of an output signal when the individual light-receiving elements are incorporated into photoelectric encoders, and therefore lowers a manufacturing yield of the light-receiving element. According to the present invention, a white light source is used, thereby reducing the change in the amount of the received light caused by the interference occurring due to the thickness of the protection film. Therefore, the manufacturing yield of the light-receiving element can be increased and the manufacturing cost can be largely reduced.

Figure 4:
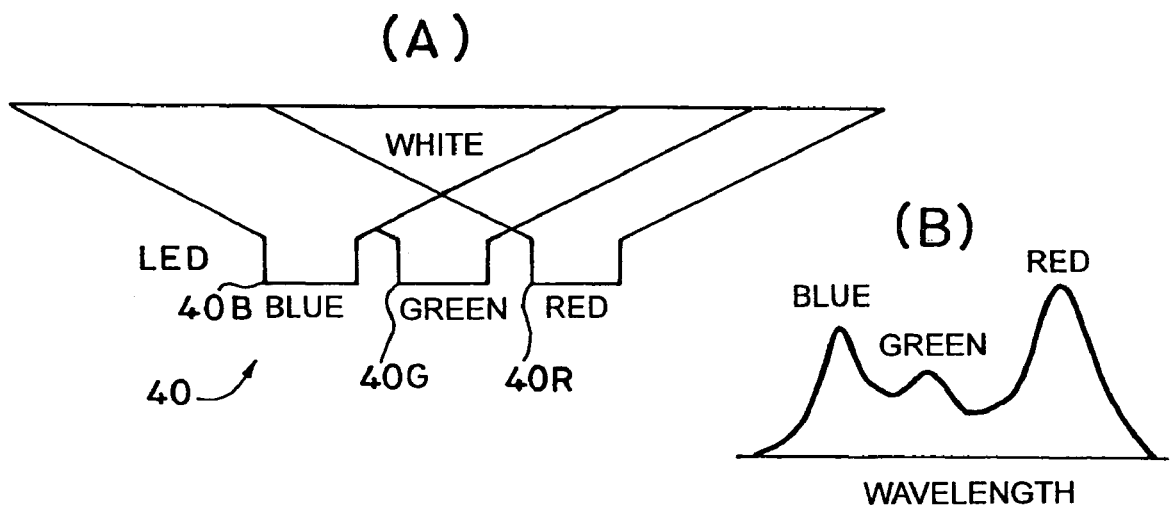
FIGS. 4A and 4B show an example of the configuration and an emission spectrum of a white LED formed by an RGB mixed LED used in the present invention, respectively.

An RGB mixed-color LED obtained by combining monochromatic LEDs 40R, 40G, and 40B having red R, green G, and blue B wavelengths as central wavelengths, respectively, can be used as the white LED 40, as shown in FIG. 4A. In this case, an emission spectrum of the RGB mixed-color LED has three peak wavelengths of R, G, and B, as shown in FIG. 4B.

Figure 5:
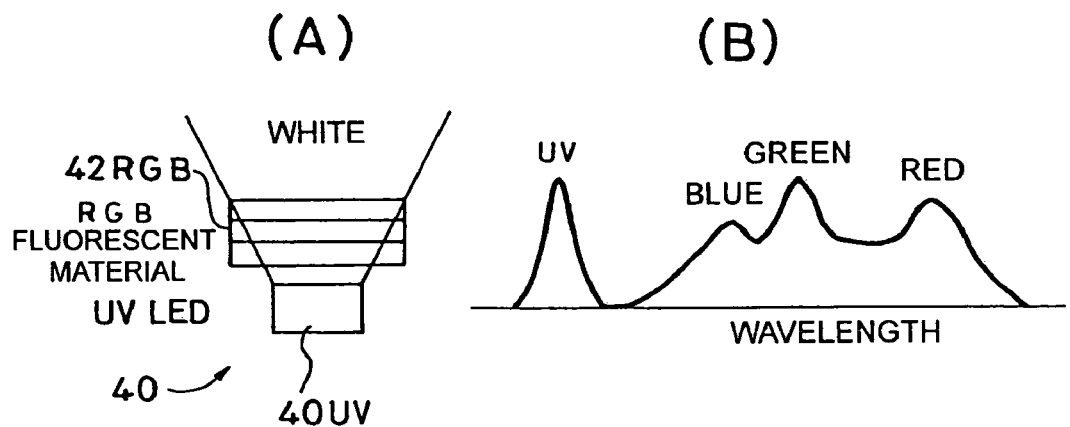
FIGS. 5A and 5B show an exemplary structure and an emission spectrum of a light source formed by a combination of a UVLED and an RGB fluorescent material, respectively.

Alternatively, a light source obtained by combining an ultraviolet (UV) LED 40UV and an RGB fluorescent material 42RGB that emits three colors of light, i.e., R light, G light, and B light so as to emit white light can be used as the white LED 40, as shown in FIG. 5A. In this case, an emission spectrum of the light source has three peak wavelengths of R, G, and B, as shown in FIG. 5B.

Figure 6:
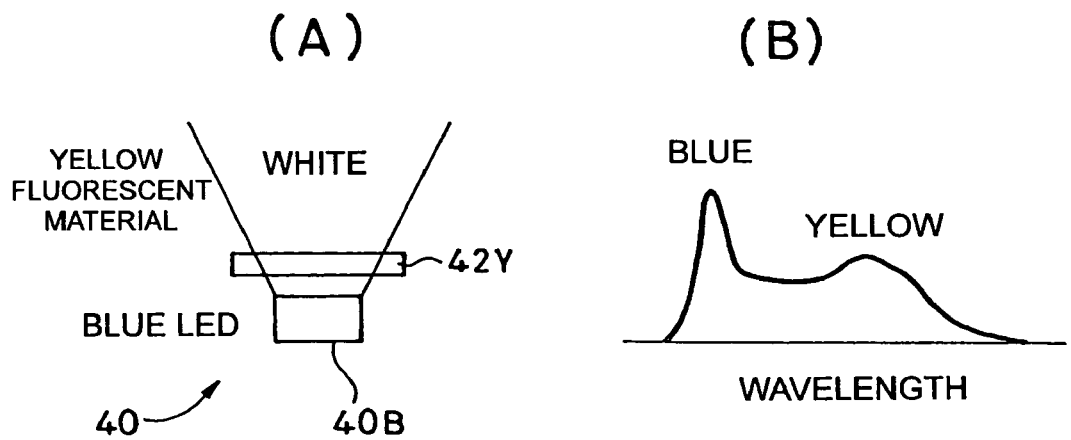
FIGS. 6A and 6B show an example of the configuration and an emission spectrum of a light source formed by a combination of a blue LED and an yellow fluorescent material, respectively.

Alternatively, a combination of a blue LED 40B and an yellow fluorescent material 42Y that emits yellow (or greenish yellow) light can be used as the white LED 40, as shown in FIG. 6A. That light source is called as a pseudo-white LED because human eyes recognize the above two colors as white. In this case, an emission spectrum of the light source has a prominent peak at a blue wavelength and a broad peak having a center at an yellow wavelength (i.e., two peak wavelengths), as shown in FIG. 6B.

Every white LED has a spectrum from red to blue, although there are various shapes of the spectrum in accordance with characteristics of an LED or a fluorescent material used in the white LED.

Figure 7:
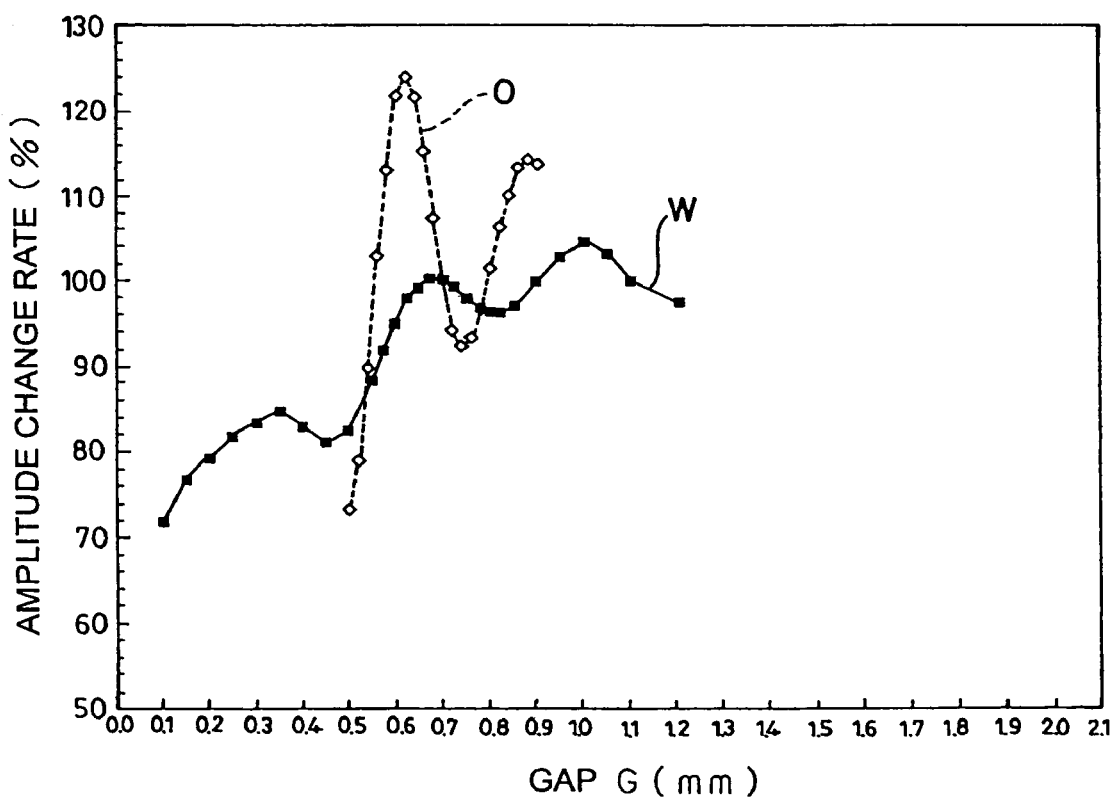
FIG. 7 shows misalignment characteristics in the first exemplary embodiment and a conventional example.

FIG. 7 shows an experimental result of misalignment characteristics in the case where the combination of the blue LED 40B and the yellow fluorescent material 42Y shown in FIGS. 6A and 6B is used as the white LED 40, with solid line W. An amplitude change rate of the misalignment characteristics is smaller, as compared with the misalignment characteristics of the conventional monochromatic LED shown with broken line O. Thus, it is found that the misalignment characteristics are largely improved.

Although LEDs 40R, 40G, and 40B of three colors are used as the white LED 40 in an example shown in FIGS. 4A and 4B, the white LED 40 can be formed by LEDs of two colors. For example, a red LED and an yellow LED may be used. In this case, a color obtained as a mixture of red and yellow is orange.

Moreover, a combination of a plurality of monochromatic laser diodes (LDs) having different central wavelengths from each other may be used in place of the white LED. For example, a combination of an infrared LD for CD or communication and a red LD for DVD may be used.

A multimode LD has two or more spectral peaks at very close wavelengths and has a smaller coherence degree than that of a single-mode LD. However, the coherence degree of the multimode LD is still higher than that of an LED. Thus, it is not expected that the multimode LD is effective. On the other hand, it is possible to use a superluminescent diode (SLD) that is a new type of LD and has no resonator structure but has a structure preventing optical feedback at an end face of the SLD element. The SLD has intermediate characteristics between those of LD and LED. Since the SLD has a coherence degree as low as that of the LED, an encoder can be formed by using a single SLD. In this case, the first-order diffracted light having a large intensity can be obtained, whereas third-order diffracted light and higher-order diffracted light that are not necessary can be reduced. Thus, a larger output current can be obtained from the light-receiving element in the case of using SLD than in the case of using an LED. Therefore, a gain of an amplifier can be set to be small. As a result, various advantages can be expected, which includes reduction of an interpolation error by improvement of an S/N ratio, improvement of frequency characteristics, and the like. In addition, it is possible to further reduce the coherence degree by using two or more SLDs having different central wavelengths from each other.

Next, a second exemplary embodiment of the present invention will be described in detail. In the second exemplary embodiment, the present invention is applied to a two-grating type transmissive encoder.

Figure 1:
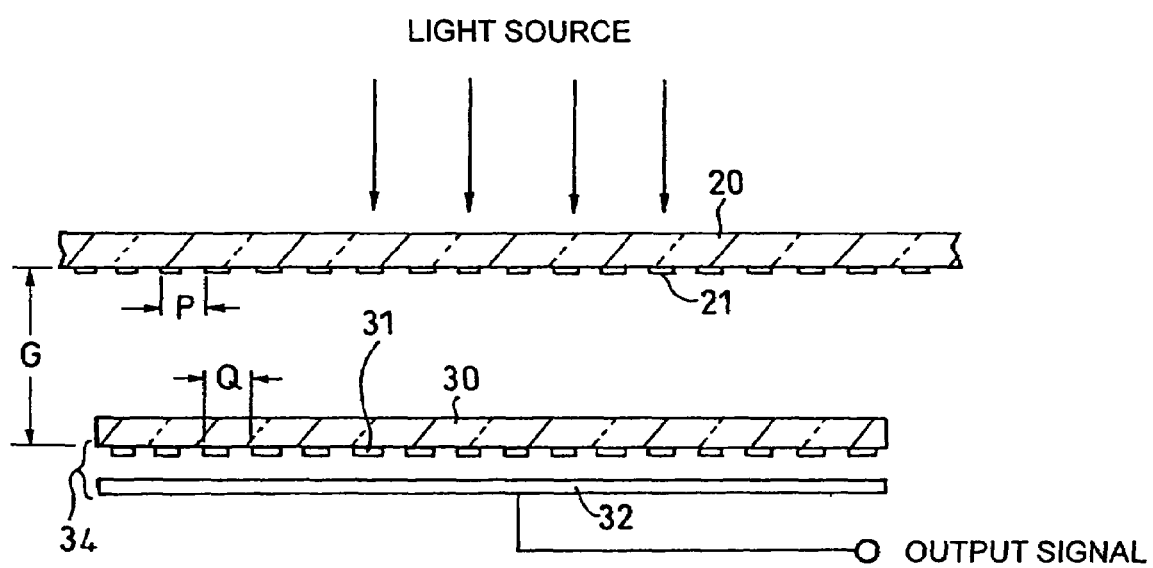
FIG. 1 is a cross-sectional view showing an example of the configuration of a main part of a two-grating type transmissive photoelectric encoder.
Figure 8:
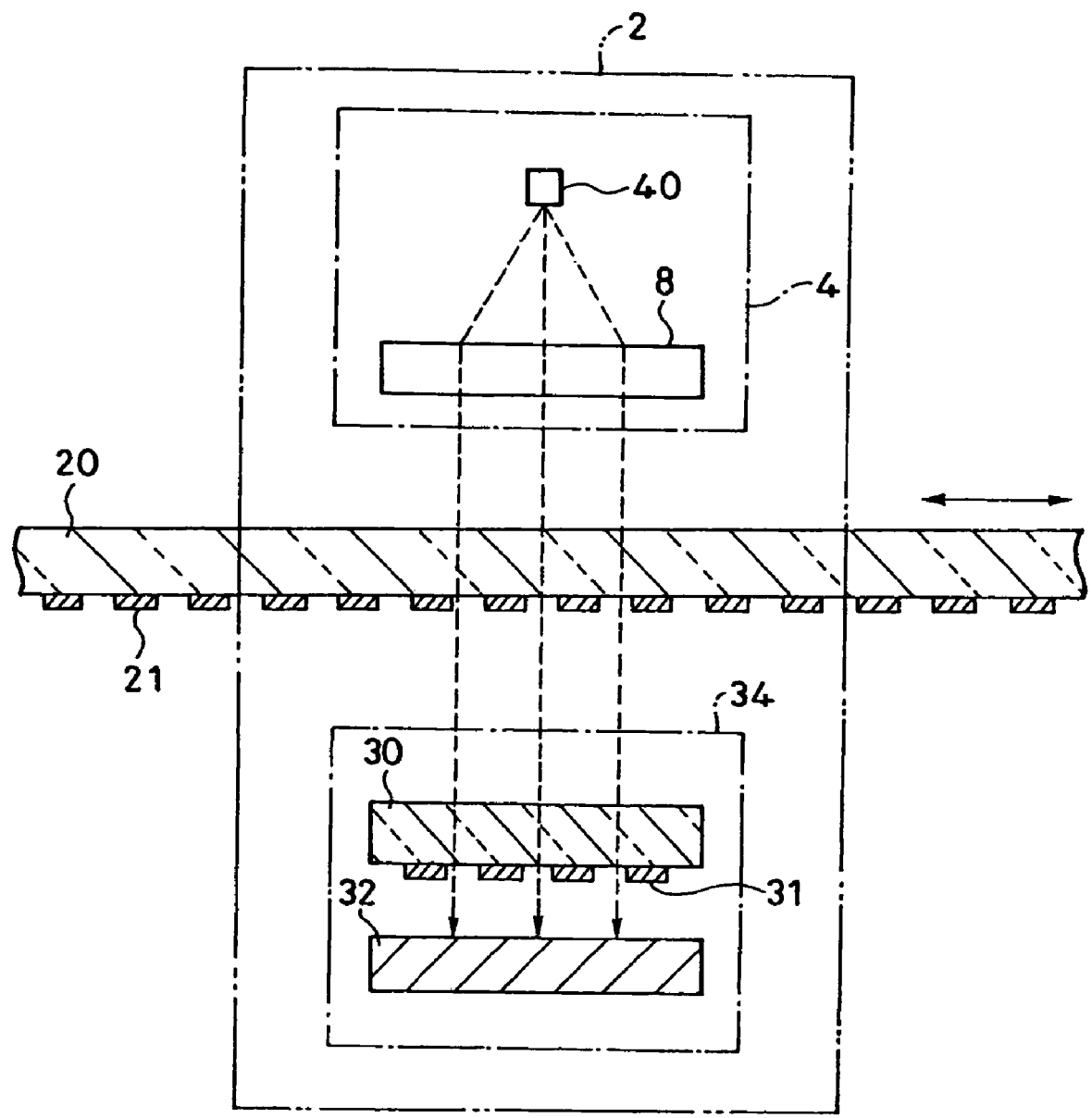
FIG. 8 is a cross-sectional view showing the configuration of a two-grating type transmissive photoelectric encoder according to a second exemplary embodiment of the present invention.

In the second exemplary embodiment, as shown in FIG. 8, the white LED 40 that is the same as that in the first exemplary embodiment is used as the light source of the light source portion 4 in the two-grating type transmissive encoder shown in FIG. 1.

Next, a third exemplary embodiment of the present invention will be described in detail.

Figure 9:
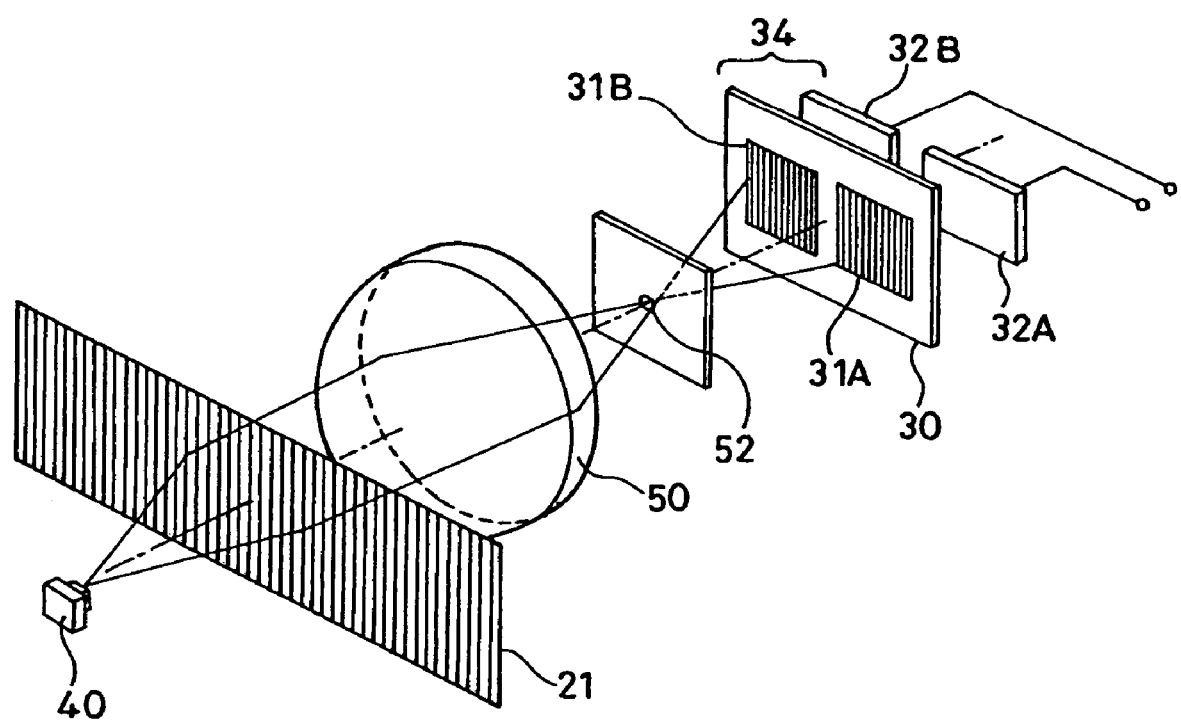
FIG. 9 is a perspective view showing the configuration of a telecentric type photoelectric encoder according to a third exemplary embodiment of the present invention.

In the third exemplary embodiment, the present invention is applied to a photoelectric encoder using a telecentric optical system, and the white LED 40 is used as the light source, as shown in FIG. 9. In the telecentric optical system, a lens 50 is inserted between a main scale 20 (not shown) on which a scale grating 21 is formed and an index scale 30 on which index gratings 31A and 31B are provided for phases A and B, respectively. An aperture 52 is also inserted between the main scale 20 and the index scale 30, if necessary. As shown in FIG. 9, the photoelectric encoder also includes light-receiving elements 32A and 32B provided for phases A and B, respectively.

Light emitted from the white LED 40 passes through the scale grating 21 of the main scale 20 and is then incident on the lens 50. Only a part of the light exiting from the lens 50, which travels along an optical axis passing through the aperture 52 provided at a focus of the lens 50, reaches the index gratings 31A and 31B and forms an image of the scale grating 21.

In the present exemplary embodiment, a magnifying power can be set by adjusting a distance between the lens 50, the scale grating 21 on the main scale 20, and the index gratings 31A and 31B on the index scale 30.

In the present exemplary embodiment, the use of a light source having a broad spectrum such as the white LED 40 can make a tolerance of a variation of parts such as a focal length of the lens 50 and an assembly tolerance such as a distance between the lens 50 and the aperture 52 larger.

In each of the above exemplary embodiments, the white LED 40 is used alone. Alternatively, a diffusing portion 60 formed by a diffuser or a prism may be used together with the white LED 40, as shown with one-dot chain line in FIG. 3 corresponding to the first exemplary embodiment. In this case, light from the light source can be diffused so as to further lower the coherence degree, thereby reducing higher-order diffracted light and suppressing the variation in the amplitude change rate of the output signal. Thus, the misalignment characteristics can be improved. In the case where no diffusing portion 60 is used, the size and cost of the encoder can be reduced.

Moreover, the index scale 30 and the light-receiving element 32 of the light-receiving portion 34 are separately provided in each of the above exemplary embodiments. However, it is apparent that the present invention can be also applied to a photoelectric encoder that uses a light-receiving-element array in which an index grating and a light-receiving element are integrated with each other and the light-receiving element is arranged in the form of a grating, as a light-receiving portion, as described in the description of Japanese Patent No. 2610624.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

What is claimed is:

1. A photoelectric encoder comprising an incoherent light source, a main scale and an index scale, the main scale and the index scale each comprising an optical grating and being movable relative to one another, and a light-receiving element which detects light from the light source interacted by the main scale and the index scale, and produces a light receiving signal corresponding to received light;

whereby a displacement between the main scale and the index scale is represented by a change in the light receiving signal;

wherein the incoherent light source comprises a plurality of monochromatic semiconductor light sources each having a different central wavelength.

2. The photoelectric encoder according to claim 1, wherein a diffusing means is combined with the incoherent semiconductor light source.

3. The photoelectric encoder according to claim 1, wherein each monochromatic semiconductor light source is a monochromatic light-emitting diode.

4. The photoelectric encoder according to claim 1, wherein each monochromatic semiconductor light source is a monochromatic laser diode.

5. The photoelectric encoder according to claim 1, wherein each monochromatic semiconductor light source is a superluminescent diode.

6. The photoelectric encoder according to claim 1, wherein one or both of the main and index scales carry an optical grating formed by a deposition film of a metal.

7. The photoelectric encoder according to claim 1, wherein a protection film is formed on a front surface of the light-receiving element.

8. The photoelectric encoder according to claim 2, wherein each monochromatic semiconductor light source is a monochromatic light-emitting diode.

9. The photoelectric encoder according to claim 2, wherein each monochromatic semiconductor light source is a monochromatic laser diode.

10. The photoelectric encoder according to claim 2, wherein each monochromatic semiconductor light source is a superluminescent diode.

11. The photoelectric encoder according to claim 1, wherein the plurality of monochromatic light sources comprises a combination of at least two of a red light source, a green light source, a blue light source, and a yellow light source.

12. The photoelectric encoder according to claim 1, wherein the plurality of monochromatic light sources includes an ultraviolet light source.

13. The photoelectric encoder according to claim 1, further comprising a lens disposed between the main scale and the index scale.

14. The photoelectric encoder according to claim 13, further comprising an aperture disposed between the main scale and the index scale.

* * * * *